P. V. VERNON.
BED FOR MACHINE TOOLS.
APPLICATION FILED JULY 1, 1919.
1,339,837.
Patented May 11, 1920.
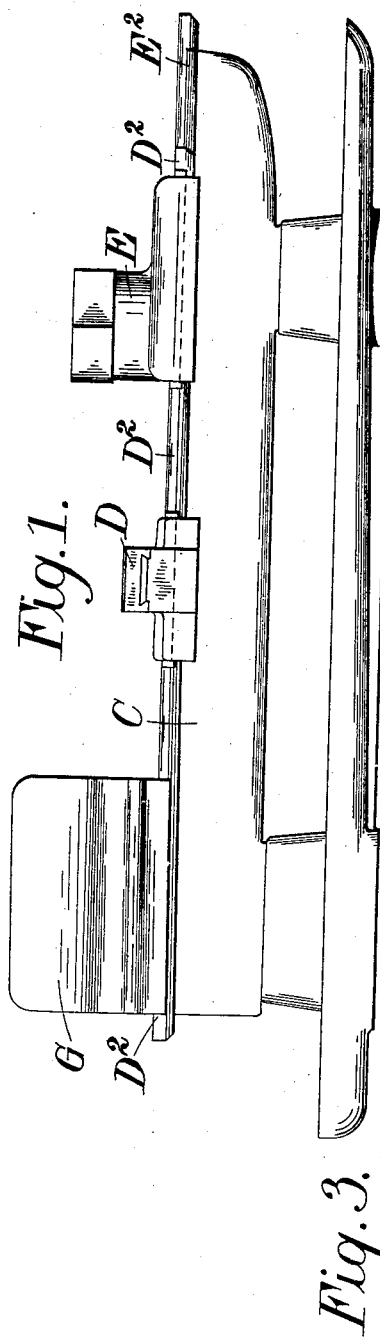
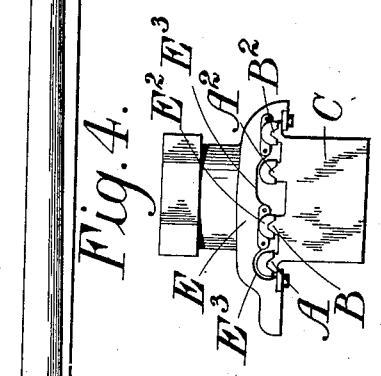
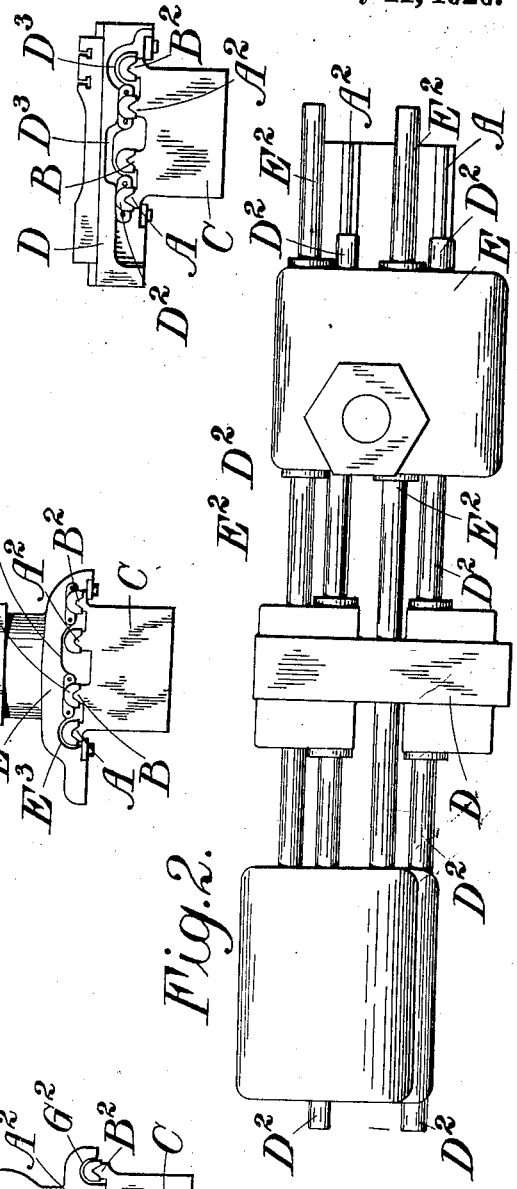
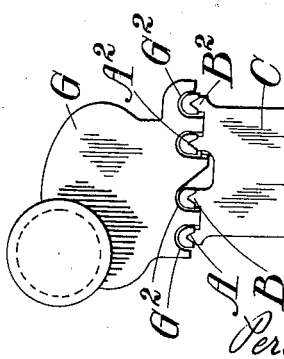
Inventor:
Percy Venables Vernon

UNITED STATES PATENT OFFICE.

PERCY VENABLES VERNON, OF KERESLEY, ENGLAND.

BED FOR MACHINE-TOOLS.

1,339,837.  Specification of Letters Patent.  Patented May 11, 1920.

Application filed July 1, 1919. Serial No. 308,013.

*To all whom it may concern:*

Be it known that I, PERCY VENABLES VERNON, a subject of the King of England, residing at Keresley, Warwickshire, England, have invented certain new and useful Improvements in Beds for Machine-Tools, of which the following is a specification.

This invention relates to the beds of lathes or like machine tools and has for its principal object to provide means whereby the guide-surfaces formed thereon for the slides carried thereon may be effectively protected from risk of damage arising from dirt, or metal chips, or by contact with work during the process of setting up or taking down the latter. The invention is particularly applicable to lathes upon which two separate slides are mounted, such as a saddle and a turret slide, but it may be applied to other machine tools.

The accompanying drawings show diagrammatically the application of the invention to a lathe, having a turret slide and a saddle adapted to slide upon its bed. In these—

Figure 1 is a front elevation.

Fig. 2 is a plan with certain parts shown in Fig. 1 omitted.

Fig. 3 is an elevation of the headstock end.

Fig. 4 an elevation of the turret end, and Fig. 5 an elevation at the same end with the turret slide removed and showing the saddle.

Like letters indicate like parts throughout the drawings.

Where only a single slide is employed extensions can be provided at each of its ends to lie over and cover those adjacent parts of the guide surface which are most liable to damage, the bases of the fixed and movable headstocks being made narrower or wider than the space between adjacent extensions so that the latter do not prevent the slide being brought close to the headstock. With two slides upon the same bed, however, such extensions cannot readily be employed upon both inasmuch as their presence would prevent the close approach of the two slides to one another, and of one of them to the fixed headstock, thereby limiting their usefulness. It is the object of the present invention to provide means whereby notwithstanding the employment of the aforesaid extensions on both slides the two slides may yet be brought close together and also close to the fixed head-stock.

According to this invention, there are combined with the bed of the machine, two sets of guides parallel to one another, one set for each slide, which slides are at each end provided with extensions to cover their respective guides, and have channels, or their equivalents, formed in their undersides to receive the extensions carried by the adjacent slide and to allow them to travel therein as the two slides approach to, or recede from one another.

The invention further provides for the formation of channels in the headstock such that the extensions aforesaid on the slides can also travel therein as the slides are moved along their guides. By this construction the extensions can be made of such a length that the whole of the guides are covered when the slides are in certain pre-determined positions.

In this construction, four guides A, $A^2$ and B, $B^2$ are formed upon the bed C thereof, parallel to one another and side-by-side, of which guides the first and third A, $A^2$ form one pair, and the second and fourth B, $B^2$ another pair. Upon the pair A, $A^2$ is mounted a saddle D and upon the pair B, $B^2$ a turret slide E. Both the saddle D and the slide E are provided at their ends with extensions $D^2$ and $E^2$ bolted thereon to lie over and protect its respective guides. Channels $D^3$ and $E^3$ are formed on the undersides of the saddle D and slide E and are so positioned that the channels of one slide lie over and receive with sliding clearance the extensions carried by the adjacent end of the other slide. In this manner the slides freely move with reference to the bed or to one another while at the same time their respective guides are covered and protected.

To enable the extensions to lie over the whole length of the guides, channels $G^2$ similar to those in the saddle and slide, are formed in the under side of the headstock G. Thus the slide and saddle can be brought close up to the headstock also, and when moved to the opposite end of the bed their extensions $D^2$ and $E^2$ still cover the intermediate parts of the guides.

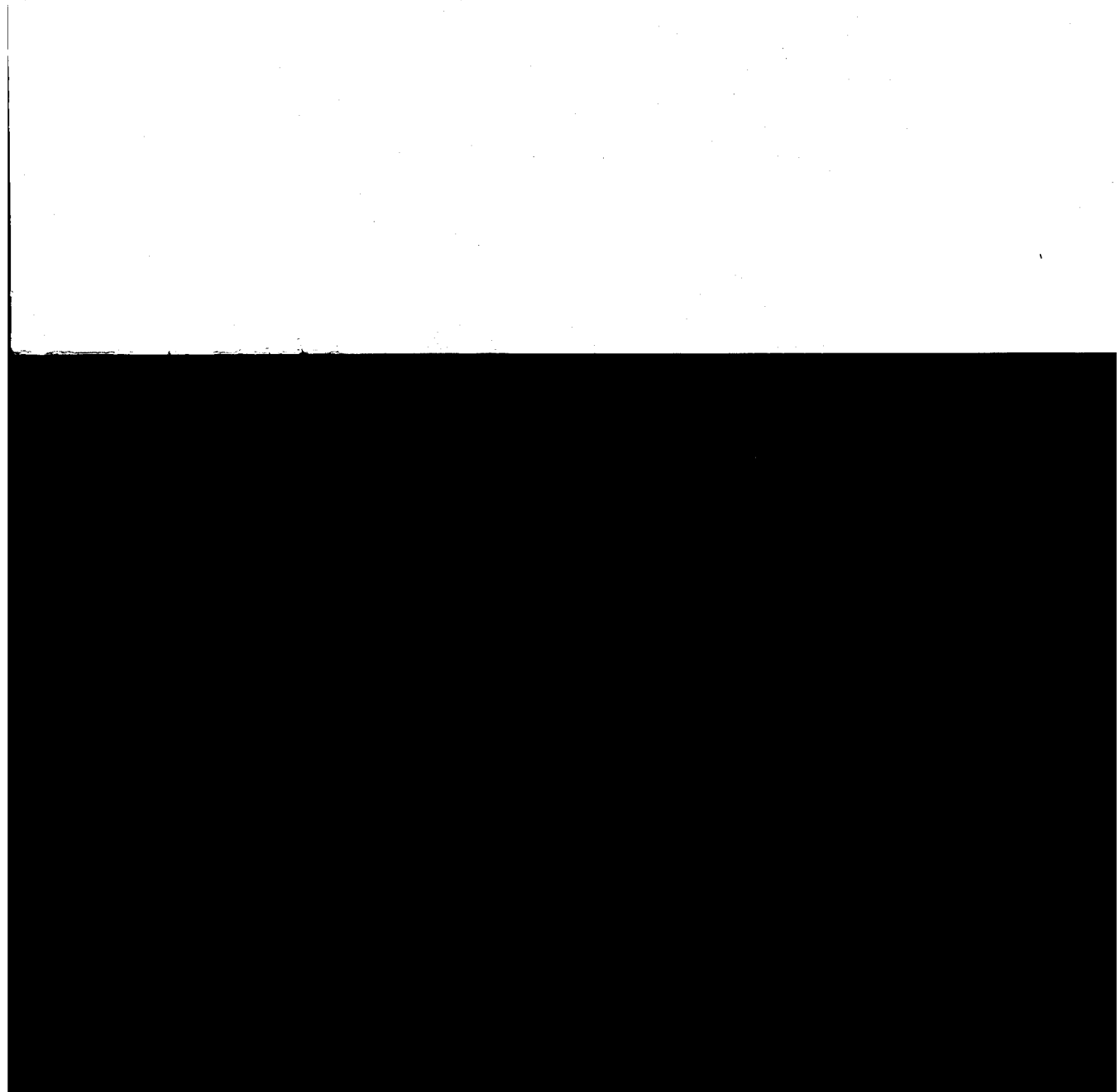

If desired the headstock may be narrow enough to lie between the outermost extensions so that channels in it need only be